United States Patent

Schmid

(10) Patent No.: US 11,479,830 B2
(45) Date of Patent: Oct. 25, 2022

(54) METHOD FOR TREATING SLAG

(71) Applicant: voestalpine Stahl GmbH, Linz (AT)

(72) Inventor: Herbert Schmid, Sipbachzell (AT)

(73) Assignee: voestalpine Stahl GmbH, Linz (AT)

( * ) Notice: Subject to any disclaimer, the term of this patent is extended or adjusted under 35 U.S.C. 154(b) by 292 days.

(21) Appl. No.: 16/643,326

(22) PCT Filed: Aug. 24, 2018

(86) PCT No.: PCT/EP2018/072904
§ 371 (c)(1),
(2) Date: Feb. 28, 2020

(87) PCT Pub. No.: WO2019/042892
PCT Pub. Date: Mar. 7, 2019

(65) Prior Publication Data
US 2020/0354812 A1 Nov. 12, 2020

(30) Foreign Application Priority Data
Aug. 28, 2017 (DE) ............... 10 2017 119 675.7

(51) Int. Cl.
*C22B 7/04* (2006.01)
*C01G 49/04* (2006.01)
*C21B 3/08* (2006.01)

(52) U.S. Cl.
CPC ............... *C22B 7/04* (2013.01); *C01G 49/04* (2013.01); *C21B 3/08* (2013.01); *C21B 2400/034* (2018.08); *C21B 2400/062* (2018.08)

(58) Field of Classification Search
None
See application file for complete search history.

(56) References Cited

U.S. PATENT DOCUMENTS 4,141,722 A * 2/1979 Takai ............... C21B 3/06
75/958
4,185,997 A * 1/1980 Inoue ............... C04B 5/00
423/151

(Continued)

FOREIGN PATENT DOCUMENTS

DE 1 228 286 11/1966
DE 1 234 748 2/1967

(Continued)

OTHER PUBLICATIONS

International Search Report in International Application No. PCT/EP2018/072904, filed Aug. 24, 2018.

*Primary Examiner* — Scott R Kastler
(74) *Attorney, Agent, or Firm* — Saliwanchik, Lloyd & Eisenschenk

(57) ABSTRACT

A method for treating converter slag for the purpose of recirculating iron, wherein a converter slag is brought into contact with oxygen in such a way that by means of turbulence, the slag is mixed, the iron and iron oxide components that are present are oxidized, and the slag is then allowed to stand in the vessel or a vessel until a segregation into a solidifying, silicate and phosphorus-rich first fraction and an underlying liquid iron oxide-rich second fraction has taken place, with the converter slag that is used being mixed with a partial flow from the iron oxide-rich second fraction in such a way that the total FeO content of the slag that is to be treated with oxygen is over 35% by weight, thus enabling the segregation into two fractions.

6 Claims, 4 Drawing Sheets

(56) References Cited

U.S. PATENT DOCUMENTS

Figure 1:
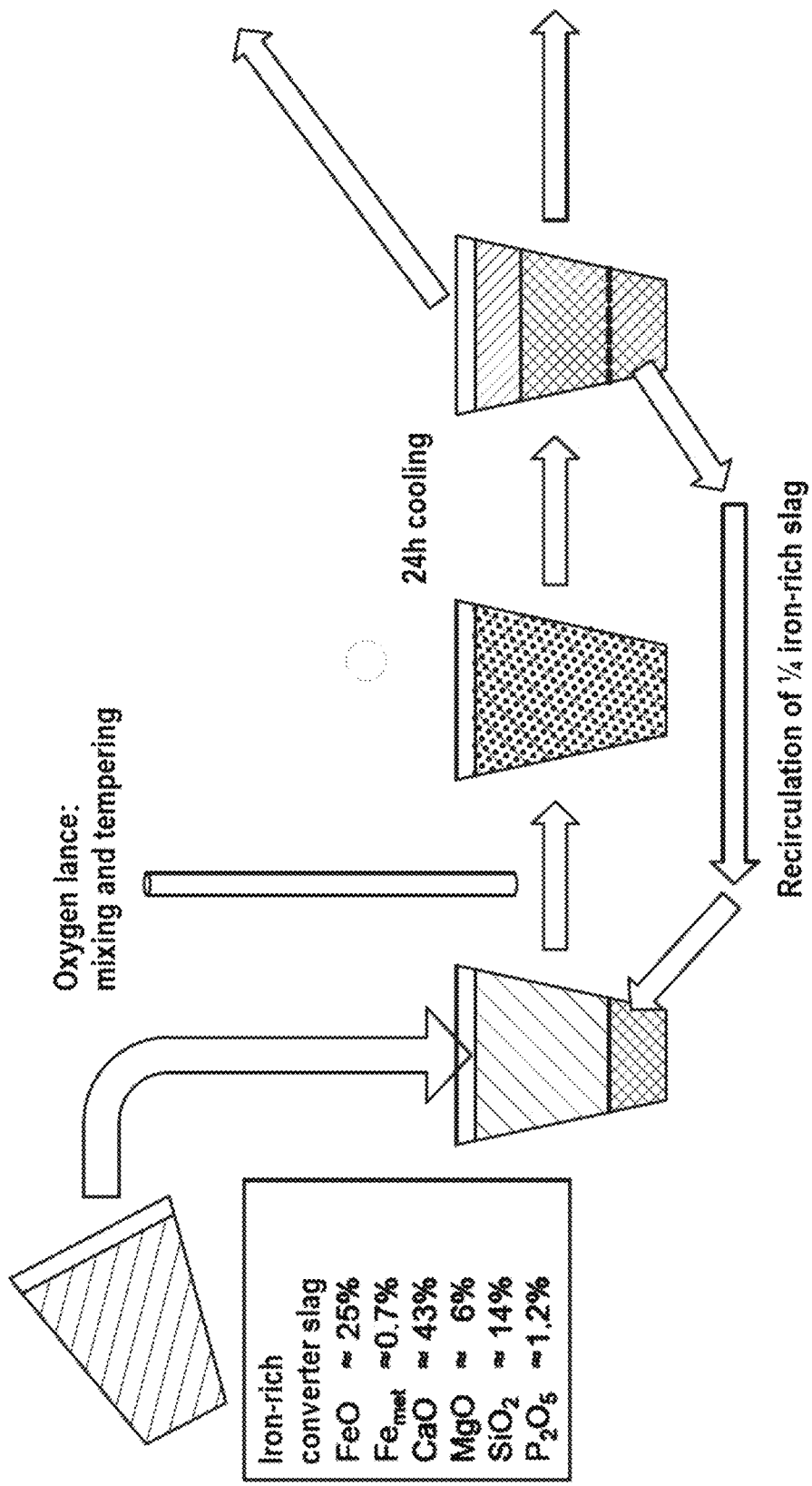

| | | | |
|---|---|---|---|
| 2003/0140732 | A1 | 7/2003 | Edlinger |
| 2006/0065071 | A1 | 3/2006 | Fleischanderl et al. |
| 2020/0354812 | A1* | 11/2020 | Schmid .................... C22B 7/04 |

FOREIGN PATENT DOCUMENTS

| | | |
|---|---|---|
| DE | 26 48 220 A1 | 8/1977 |
| DE | 10 2008 038 692 A1 | 3/2010 |
| EP | 0 934 432 B1 | 7/2001 |
| EP | 2 383 352 A1 | 11/2011 |
| EP | 2 759 606 A1 | 7/2014 |
| EP | 2 767 597 A1 | 8/2014 |
| GB | 1074209 | 6/1967 |
| GB | 1146160 | 3/1969 |
| JP | 53-54196 A | 5/1978 |
| WO | WO-98/17832 A1 | 4/1998 |
| WO | WO-2004/101828 A1 | 11/2004 |

\* cited by examiner

| Mass flow balance and FeO balance for continuous process – example 2 | | | | | |
|---|---|---|---|---|---|
| Product | Mass % | Content FeO% | Mass per slag bucket, t | | |
| | | | Slag | FeO content | |
| Fresh material | 0.6 | 25 | 18 | 4.5 | |
| Returned material | 0.4 | 50 | 12 | 6 | |
| Mixed material | 1 | 35 | 30 | 10.5 | |
| Iron-poor output | 0.5 | 20 | 15 | 3 | |
| Iron-rich output | 0.1 | 50 | 3 | 1.5 | |

FIG. 3

| Sample/analysis value | FeO | Fe-met | CaO | MgO | SiO2 | P2O5 |
|---|---|---|---|---|---|---|
| Slag charge 1 | 35.2 | 0.8 | 37.5 | 5.7 | 11.2 | 1.1 |
| Cover charge 1 | 20.9 | 0.4 | 47.3 | 5.4 | 16.6 | 1.6 |
| Residual melt charge 1 | 49.6 | 1.1 | 25.7 | 5.6 | 6.8 | 0.6 |
| Slag charge 2 | 25.5 | 0.7 | 43.1 | 6.1 | 13.8 | 1.2 |
| Cover charge 2 | 21.5 | 0.3 | 46.9 | 5.7 | 15.9 | 1.3 |
| Residual melt charge 2 | 53.1 | 1.8 | 21.2 | 6.6 | 5.9 | 0.5 |

FIG. 4

METHOD FOR TREATING SLAG

CROSS-REFERENCE TO RELATED APPLICATIONS

This application is the U.S. national stage application of International Patent Application No. PCT/EP2018/072904, filed Aug. 24, 2018, which claims the benefit under 35 U.S.C. § 119 of German Application No. 10 2017 119 675.7, filed Aug. 28, 2017, the disclosures of each of which are incorporated herein by reference in their entirety.

The invention relates to a method for treating converter slag in steel production.

In steel production, slags accumulate in a number of fields. In metal working, slags are usually used either to cover a liquid metal melt in order to protect it from the atmosphere or to absorb by-metals from the melt in order to purify the melt of these by-elements.

Usually, such slags are essentially mineral slags, which may possibly also contain organic components.

During the production of steel in the converter and particularly in the Linz-Donawitz converter (LD converter), slag is likewise used to cover the steel melt and some slag is produced as a result of the oxidizing treatment. These are usually basic slags based on calcium.

At the converter tap, a tapping is performed so that on the one hand, the steel is poured off from the converter usually into a ladle whereas the slag is poured off into a slag receptacle. In addition to the slag, certain quantities of steel melt are also transferred into the slag receptacle along with it; in addition, the slag itself still contains iron in the form of iron oxide.

In the prior art, it is known to prepare the slag by means of slag treatment methods because the slag is particularly sought-after as a raw material for cement manufacturing. For this, the iron oxide contained in the LD slag is reduced to a metal bath in the first step and this metal bath is then dephosphorized by means of an oxidizing treatment. In this case, oxidizing and reducing treatments can be carried out in alternation in one and the same vessel or the metal from the reducing treatment is tapped off into a treatment ladle and in it, is transported to the oxidizing treatment station in which the dephosphorization is carried out.

EP 23 883 352 A1 has disclosed a method for treating slags from converters in which LD slag is reduced in a vessel and mineral components such as carbon, silicon, and aluminum are added. This essentially involves recovering the iron, which is still present in the slag and which is in the form of iron oxide, and removing it from the slag.

WO 2004/101828 A1 has disclosed a method for utilizing oxidic iron particle-containing slag from the iron-smelting industry in which a reducing agent is added and a reduction of the oxidic iron particles in the slag is carried out. For this, the slag is fed into a reactor vessel and is then electrically heated. A carbon-containing reducing agent is blown in over a longer period of time. After the reduction is completed, the slag is tapped off and any liquid iron that is present is likewise tapped off except for a carbon-containing residual iron melt.

EP 2 767 597 A1 has disclosed a method for reducing steel slag in which converter slag is continuously or intermittently fed into a corresponding vessel; in the treatment vessel, a molten slag layer is present on a molten iron layer and the mixture is electrically heated and is treated in a non-oxidizing atmosphere. The pouring-off of the iron that is present in the treatment vessel and of the slag contained therein takes place discontinuously.

A comparable method is disclosed in EP 2 759 606 A1; this is a variant of the above-mentioned method. It proposes adding even more raw materials to the slag bath.

EP 0 934 432 B1 has disclosed a method for dechroming or depleting the MgO content of steel slags; oxygen is added to the liquid steel slag in a volume that is sufficient to quantitatively convert iron into iron oxide and to quantitatively convert at least 5% by weight of the iron oxide contained in the slag to iron-3-oxide, to solidify and grind the oxidized slag, and to magnetically separate the resulting paramagnetic ingredients (magnetite, $Fe_3O_4$) and remove them from the dechromed slag; the liquid steel slag is refined by introducing oxygen, as a result of which residual iron contained in the steel slag is quantitatively oxidized so that the subsequent grinding can be safely performed, for example, by means of granulating water or through the use of steam.

It is also known to recover iron from steel slags by carrying out a rapid cooling of the slag or by adding various fluxes such as fluorite or iron ore.

In the prior art, it is disadvantageous in this connection that adding flux is expensive and complicated and is sometimes problematic from an environmental standpoint.

The iron/phosphorus separation is also problematic; in particular, it is often generally disadvantageous in all reprocessing methods that certain components are conveyed back into the cycle and then accumulate in the cycle.

The object of the invention is to create a method for treating slag that is able to recover the iron in an efficient way with a simultaneously favorable iron/phosphorus separation and also with relatively low iron oxide contents.

The object is attained with a method as described herein.

Advantageous modifications are disclosed herein as well.

According to the invention, the iron recovery, particularly from LD slag, succeeds by means of phosphorus separation without a complicated reduction in a cost-intensive system.

According to the invention, the method should separate the LD slag into an iron-rich fraction and a silicate and phosphorus-rich fraction; this only succeeds if a certain iron content is exceeded, but this is not frequently present. Thus according to the invention, an iron-rich partial flow from a very iron-rich slag charge is mixed with an iron-poorer slag charge and is heated by blowing in oxygen and then making use of a segregation effect. From an iron-rich residual melt, a partial flow is added to the next charge of iron-poorer slag. The portion that is not recycled is separately cooled, ground, and, by means of the sintering system and smelting furnace, is introduced into the pig iron process; a high rate of iron recovery is advantageously achieved with a low reverse transport of phosphorus.

According to the invention, use is made of the different solidification temperatures of calcium silicates and iron-rich phases, i.e. FeO and ferrite. But in order for a segregation to take place, a FeO-richer melt from previous treatment charges must be continuously added.

According to the invention, this can take place for example by recirculation, mixing, cooling, and segregation during the solidification in the slag bucket or in a reaction vessel that comprises two chambers; in a first chamber, the mixing of freshly supplied LD slag with residual melt from preceding charges as well as a heating and mixing through the blowing-in of oxygen are carried out and in the second chamber, the quieting, slow cooling, solidification, and tapping of both the silicate and phosphorus-rich upper fractions and the lower, still-liquid iron-rich residual melt are carried out.

Consequently, a fractionated crystallization in the mixtures takes place; phosphorus-containing dicalcium silicates are first collected in the upper region of a reaction vessel and solidify there due to the crystallization, whereas still-liquid, iron oxide-enriched, phosphorus and silicate-reduced residual melt is collected at the bottom.

As has already been explained above, a partial flow of this very same iron-rich, silicate and phosphorus-poor residual melt is added to the next slag charge and the mixture is heated with oxygen and then slowly cooled.

As a result, the iron-rich residual melt serves as a solvent so to speak for improving the segregation.

In order to achieve the desired segregation effect, the iron oxide content must be 35% or more.

The result of the segregation is then a residual melt with an iron-rich product, which contains more than 50% iron oxide and an iron-poor, but silicate and phosphorus-rich solidification product with an iron oxide content of approximately 20%.

Figure 2:
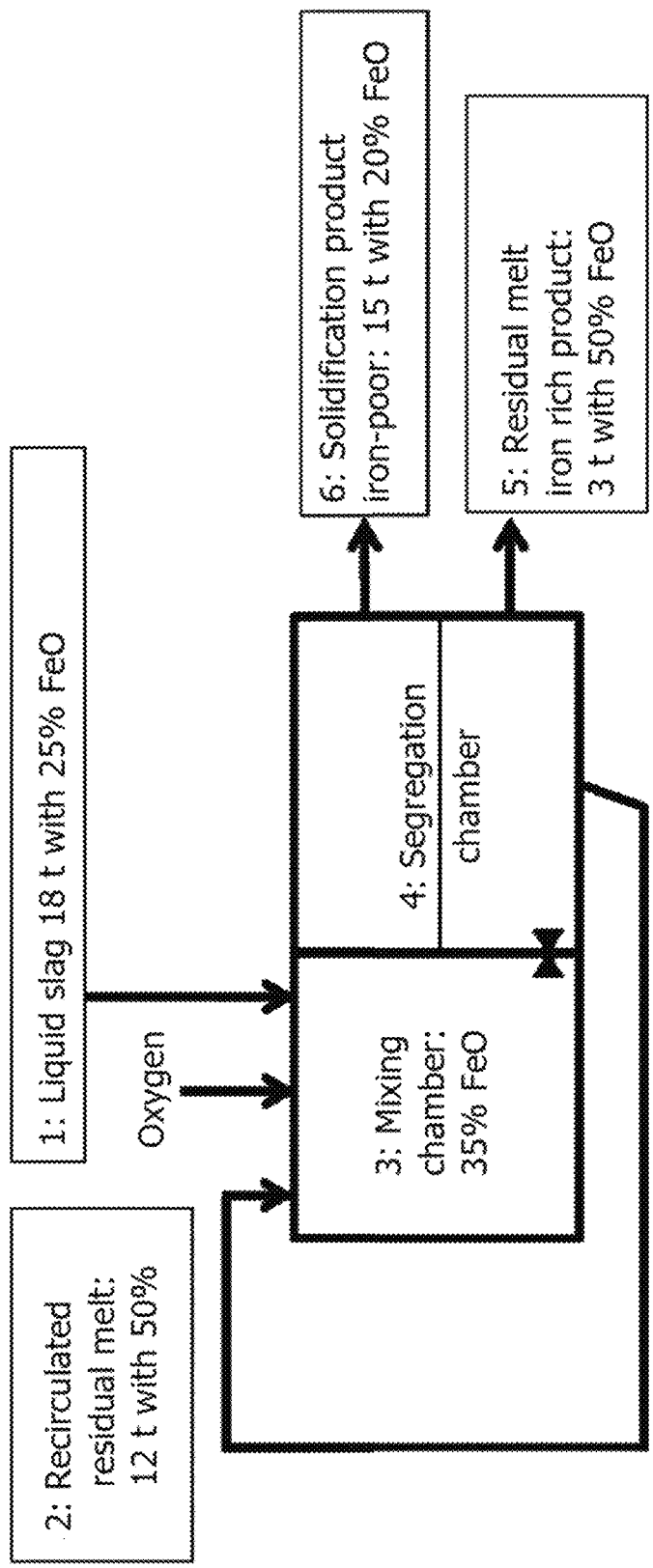

The invention will be explained by way of example based on the drawings. In the drawings:

FIG. 1: shows a schematic flowchart showing the method according to the invention;

FIG. 2: shows the schematic diagram and a mass flow graph for a second exemplary embodiment;

FIG. 3: is a table showing a mass flow balance and FeO balance for a continuous process according to example 2;

FIG. 4: shows sample analysis values for the charges that accumulate in the process.

According to the invention, it has been discovered that a—not yet performed—recovery of iron oxide from LD slags succeeds because the accumulating LD slag is treated in such a way that a segregation into a FeO-rich fraction and a FeO-poor fraction takes place.

Here, this segregation succeeds solely because after the treatment, an iron-rich slag partial flow is recycled and before the treatment, the FeO content of the slag used is adjusted to the required value of >35%.

Only with iron oxide contents above 35% does the segregation effect occur, which then results in a relatively large FeO-poor partial flow and a relatively small FeO-rich partial flow. According to the invention, this FeO-rich partial flow is partly used for increasing the FeO content of freshly introduced slag so that it contains above 35% FeO.

This melt with the adjusted FeO content is treated with an oxygen lance, which causes heavy turbulence that results in a thorough mixing and the oxidation of the metallic and bivalent iron generates a significant temperature increase.

For example (FIG. 1), an iron-poor converter slag has a FeO content of 25%, a metallic iron content of 0.7%, a calcium oxide content of 43%, a magnesium oxide content of 6%, a silicon oxide content of 15%, and a phosphorus oxide content of 1.2%. This slag is dispensed into a receptacle and is supplied with an iron-rich residual melt from a preceding treatment. For example, this iron-rich residual melt has an iron oxide content of 55%, a metallic iron content of 1.8%, a calcium oxide content of 21%, a magnesium oxide content of 7%, a silicon dioxide content of 6%, and a phosphorus oxide content of 0.5%.

Based on the knowledge of the analysis values, it is thus possible to simply add enough iron-rich residual melt to the iron-poor converter slag that the total iron oxide content is adjusted to the required 35%.

This overall mix is then processed with an oxygen lance; in particular, oxygen is blown in, which, as already explained above, results in the heating and mixing effect. This slag mix is then allowed to cool for 24 hours, which then produces a segregation from an overlying, solidified iron-poor residual melt, which has an iron oxide content of 21%, a metallic iron content of 0.3%, a calcium oxide content of 47%, a magnesium oxide content of 5.5%, a silicon oxide content of 16%, and a phosphorus oxide content of 1.3%. Below this iron-poor residual melt, the above-described iron-rich residual melt has collected, which can then be supplied back to the iron-poor converter slag.

It is conceivable for there to be slightly different embodiments of the method here. In a first embodiment, an empty slag bucket is filled with an LD converter slag, which according to the analysis, is iron-rich (as happens from time to time). After 24 hours, the so-called cover composed of solidified slag is broken open and the remaining residual melt is dispensed into an empty slag bucket. During the dispensing, a sample is taken for the chemical analysis and the temperature is measured. The temperature is 1280° C., which is already close to the solidification temperature of calcium ferrites. An iron-poor converter slag is poured onto this residual melt. In terms of its contents, the slag bucket is approximately ¼ filled with the iron-rich residual melt. Then the mixture composed of ¼ more iron-rich melt and ¾ iron-poor converter slag is treated with an oxygen lance. The injection jet produces heavy turbulence, which results in a thorough mixing of the two slag types and the oxidation of the metallic and bivalent iron generates a significant temperature increase.

This heated and mixed slag is covered and allowed to stand for 24 hours and the cover is then once again broken open and samples are taken from the solidified crust and from the remaining residual melt.

The chemical analysis values are listed in FIG. 4. In this case, FeO should be understood as a collective analysis for the entirety of the oxidically bonded iron, calculated based on the entirety of the metallic iron. It is clear that the iron-rich first slag charge has a FeO content of 35.2%, which enables the segregation. The mineral cover that forms on it has an iron oxide content of 20.9% while the residual melt formed under the cover has a FeO content of 49.6%.

The subsequently added iron-poor converter slag has a FeO content of 25.5% and the cover has a FeO content of 21.5%.

After the oxygen treatment and the 24-hour rest phase, the resulting iron-rich residual melt has a FeO content of 53.1% so that this residual melt is once again favorably suitable for increasing the iron content of an iron-poor converter slag charge to above the required 35%.

For the start of the method, it is therefore advantageous to wait until a very iron-rich converter slag is present in order to provoke a segregation and thus to provide a base stock of a very iron-rich residual melt after the treatment.

Then according to the invention, through the addition of the very iron-rich residual melt from the segregation of the iron-rich converter slag, it is also possible to cause any subsequent iron-poor converter slag to undergo segregation.

In another advantageous embodiment, a corresponding treatment vessel is provided, the treatment vessel having two chambers, which are separated by a partition wall. Just above the bottom of the trough, the partition wall has window-like openings so that the two chambers can communicate with each other if so desired.

First, the liquid converter slag is dispensed directly into the first chamber. If it is a very iron oxide-rich converter slag, it can then be treated with oxygen.

The solidification of the slag begins by crystallization of the silicates, but the slag in the first chamber is always kept liquid by means of the oxidation of the metallic and bivalent iron with the introduced oxygen.

Through the opening near the bottom of the partition wall, slag flows continuously into the second chamber, which is embodied in the form of a quieting and sedimentation tank.

This second chamber is advantageously equipped with a scouring apparatus that is known from the desulfurization of liquid pig iron. It also includes a device for breaking open crusts made of solidified slags. With the scouring apparatus, the already solidified solid slag chunks, which are predominantly composed of silicates and float on the still-liquid slag that is continuously solidifying at the surface, are removed and broken loose if necessary.

In intervals that are aimed at maintaining a bath level that is as constant as possible after the supplying of fresh slag, the liquid iron-rich residual melt that has collected at the bottom is also removed and part of it is conveyed back into chamber 1 in order to constantly enable a good segregation by means of a sufficiently high FeO content.

In this embodiment as well, it is possible to initially use a (randomly) occurring, very iron-rich converter slag with a FeO content of more than 35%. Alternatively to this, it is also possible to use an iron-poorer converter slag and correspondingly, as is also the case later in the continuous process, to then also use a previously collected liquid FeO-rich residual melt.

The invention has the advantage that without a high degree of complexity and especially without the addition of additives external to the process, it is possible to carry out the separation of converter slag into an iron oxide-rich fraction and a silicon and phosphorus-rich fraction so that the iron-rich residual melt is supplied back to the smelting furnace process, thus enabling the recovery of iron.

The invention claimed is:

1. A method for treating converter slag for the purpose of recirculating iron, the method comprising the steps of:
   a) contacting a converter slag with oxygen in such a way that by means of turbulence, the converter slag is mixed, and iron and iron oxide components that are present are oxidized;
   b) resting the converter slag such that it is allowed to stand until a segregation into a solidifying, silicate- and phosphorous-containing first fraction and an underlying liquid iron oxide-containing second fraction has taken place;
   c) measuring an FeO content and an iron content of a first liquid melt of the converter slag before step a) and measuring the iron content of the second fraction as a second liquid melt generated after steps a) and b); and
   d) after step c), calculating and mixing a ratio of the first liquid melt and the second liquid melt to give a mixed liquid melt such that after the mixing, an FeO content of over 35% by weight of the mixed liquid melt is achieved.

2. The method according to claim 1, wherein after step a) the converter slag rests for at least 24 hours in step b).

3. The method according to claim 1, wherein during step a), oxygen, air, or mixtures of oxygen and air or oxygen and gas are blown onto or into the converter slag in order to bring it into contact with oxygen.

4. The method according to claim 1, further comprising, prior to step a), feeding the converter slag into a receptacle and supplying an iron-containing second fraction residual melt to the receptacle, in accordance with the calculating, and then steps a) and b) take place until the solidification of the first fraction has taken place and the second liquid fraction is present underneath it.

5. The method according to claim 1, wherein:
   steps a) and b) are performed in a vessel comprising a first chamber and a second chamber;
   the first chamber and the second chamber of the vessel are separated from each other by a partition wall having at least one opening above a bottom of the partition wall;
   the first chamber is filled with liquid converter slag and after each filling of the first chamber with a slag charge, oxygen is introduced above the slag charge in the first chamber via oxygen or an oxygen-containing gas being blown onto or through it;
   through the at least one opening near the bottom of the partition wall, slag flows into the second chamber, which is a quieting and sedimentation tank;
   the second chamber comprises a scouring apparatus;
   the method further comprises removing solidified slags comprising silicates;
   the method further comprises supplying fresh converter slag in such a way that a relatively constant bath level is present in the first chamber and the second chamber; and
   wherein the method further comprises removing liquid FeO-containing residual melt that collects at a bottom of the second chamber and supplying it to the first chamber in order to adjust the FeO content.

6. The method according to claim 5, wherein an iron content of the fresh converter slag is continuously measured and the FeO content of the FeO-containing residual melt is measured in order to adjust to the FeO content such that it is always above 35%.

* * * * *